United States Patent [19]

Thompson et al.

[11] Patent Number: 4,772,351
[45] Date of Patent: Sep. 20, 1988

[54] CAM OPERATED TIRE BUILDING DRUM

[75] Inventors: Glen R. Thompson, Akron; John A. Bordas, Greenwich, both of Ohio

[73] Assignee: Eagle-Picher Industries, Inc., Cincinnati, Ohio

[21] Appl. No.: 105,096

[22] Filed: Oct. 5, 1987

[51] Int. Cl.[4] .............................................. B29C 45/38
[52] U.S. Cl. .................................................... 156/417
[58] Field of Search ........................ 156/414, 415, 417

[56] References Cited

U.S. PATENT DOCUMENTS

| 1,704,440 | 3/1929 | Little | 156/417 |
| 2,926,721 | 3/1960 | Haase | 156/415 |
| 3,485,700 | 12/1969 | Cooper et al. | 156/417 |
| 3,779,835 | 12/1973 | Lohr et al. | 156/417 |
| 4,436,574 | 3/1984 | Long et al. | 156/417 |
| 4,683,021 | 7/1987 | Stalter | 156/415 |

Primary Examiner—Willard Hoag
Attorney, Agent, or Firm—Wood, Herron & Evans

[57] ABSTRACT

A tire building drum having collapsible and expandable segments that form a cylinder upon which a tire is built. The segments are connected to a cam, which when rotated with respect to them, causes the segments to expand or collapse.

4 Claims, 4 Drawing Sheets

CAM OPERATED TIRE BUILDING DRUM

This invention relates to a tire building drum, and more particularly, the invention relates to an improvement in the tire building drum disclosed in U.S. Pat. No. 3,779,835.

A tire building drum of U.S. Pat. No. 3,779,835 is formed of alternating large and small arcuate segments that are rotatably mounted on a power shaft. The segments are slidably mounted on radial posts forming a spider. The segments carry cam followers that are inserted into cam slots formed in cam plates mounted on the drive shaft. Normally, the segments and cam plate are maintained rotationally fixed with respect to each other by spring-loaded poppets. In the course of tire building, the cam is driven by the power shaft and the poppet connection causes the segments to rotate with the cam, thereby rotating the segments as a cylinder to permit strips of rubber to be wrapped around the drum in the course of the tire building process. After a carcass has been built up on the drum, the segments are rotationally fixed by means of a brake and, through the power shaft, the cam plates are rotated in a direction to collapse the segments, overriding the poppet connections, to permit the removal of the carcass. After removal of the carcass, the cam plate is rotated in the opposite direction to return the segments to the position in which they form a complete cylinder for the next tire building operation.

The tire building drum of U.S. Pat. No. 3,779,835 has enjoyed considerable commercial success since its creation. It has presented a problem, the solution to which has not been forthcoming until the present invention. The problem is that upon acceleration or deceleration, particularly in the larger documents, the inertia of the segments causes them to inadvertently ride out of the poppet connection whereupon the cam follower riding in the cams causes the segments to collapse.

An objective of the present invention has been to provide a solution to the problem of inadvertent collapse of the segments upon acceleration or deceleration.

The objective of the invention is attained by minimizing the mass and radius of the mass that creates the inertia that in turn causes the inadvertent collapse of the segments, that inertial force being proportional to the mass and the square of the radius.

More specifically, the objective is attained by fixing the segments to the power shaft against rotational movement while permitting radial sliding movement for the contraction and expansion. Thus, with the heavy and radially extreme arcuate segments fixed against rotation with respect to the power shaft, they can create no inertial force upon acceleration or deceleration of the power shaft. To effect the collapse of the elements, the cam plates are mounted on a sleeve which is rotatable with respect to the power shaft. The cam sleeve is connected by a poppet to the power shaft so that during the normal operation of tire building, the drive shaft drives the arcuate segments directly and drives the cam plate through the poppet connection. When the segments are to be contracted or expanded, the cam plate is rotationally fixed by means of a brake and the segments are rotated, by rotating the power shaft, through a limited angle to cause the followers on the segments to coact with the cam plate to effect the collapse of the segments.

With the improved organization of the elements, the center of the mass (primarily the cam plates) that is rotatable with respect to the drive shaft has been moved significantly radially inwardly and its mass has been greatly reduced. Thus, the poppets have a much smaller force to contend with in order to keep the cam plates and segments together during acceleration and deceleration.

The several features and objectives of the invention will become more readily apparent from the following detailed description taken in conjunction with the accompanying drawings in which.

Figure 1:
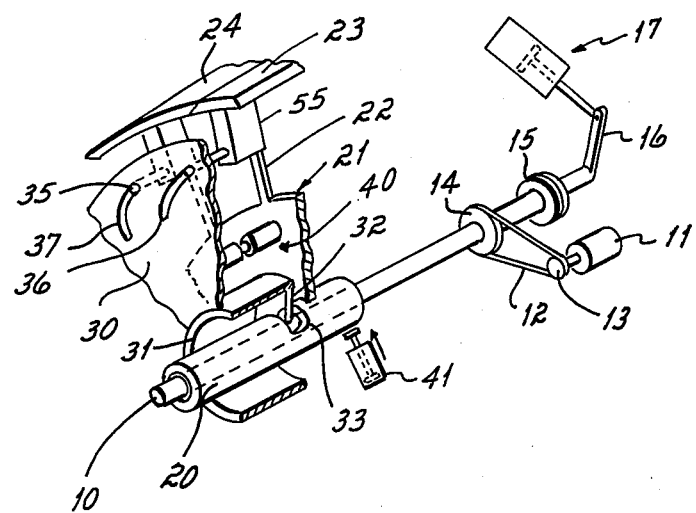
FIG. 1 is a diagrammatic perspective view of the prior art.

The prior art of the type disclosed in U.S. Pat. No. 3,779,835 is shown in FIG. 1. A drive shaft 10 is driven by a motor 11 through a V belt 12 and pulleys 13 and 14. The drive shaft is connected by a clutch 15 to a lever arm 16. The lever arm 16 is connected to a piston and cylinder 17. With this organization, the drive shaft can be driven by the motor to rotate it for the tire building process. When the motor is deenergized, the drive shaft can be driven through a limited angle by engaging the clutch 15 and actuating the piston and cylinder 17. A hub sleeve 20 is rotatably mounted on the power shaft 10. A spider 21 is fixed to the hub sleeve, the spider consisting of a plurality of guide posts 22—eight, for example. Each post carries a small segment 23 or a large segment 24. A cam plate 30 is mounted on a cam plate sleeve 31 which is rotatably mounted on the hub sleeve 20. A key or drive dog 32 fixed to the drive shaft 10 passes through an arcuate slot 33 in the hub sleeve 20 and is connected to the cam sleeve 31. A spring-loaded ball forming a poppet 40 normally connects the cam plate 30 to the spider 21 and hence the segments 23, 24.

A brake 41 is engageable with the sleeve 20 to brake the sleeve, thereby holding the segments against rotation during contraction and expansion of the segments.

In operation of the prior building drum, the drive shaft 10 drives the cam sleeve 31 and cam 30 through the key 32. The cam plate, through the poppet connection 40, drives the spider 21 and the segments 23, 24. The segments 23, 24, in their expanded condition, form a cylinder about which rubber is wrapped to build a tire. After the tire carcass is built, the motor 11 is deenergized. Clutch 15 is engaged and brake 41 is engaged. Piston and cylinder 17 rotate the shaft 10 via clutch 15, through a limited arc, carrying the cam with it, while the segments, attached to the sleeve 20, are held against rotation by the brake 41. The relative rotation of the cam plate 30 overcomes the spring of the poppet 40 and causes the segments 23, 24 with followers 35 riding in cam arcs 36 to move radially inwardly, thereby collapsing the drum and permitting the removal of the tire carcass. Reciprocation of the shaft 10 by the piston and cylinder 17 in the opposite direction expands the segments, thereby reforming the drum cylinder. Thereafter, brake 41 and clutch 15 are disengaged to permit the building of a new tire.

It can be observed that the plural segments 23, 24 provide the major portion of the rotating mass and the segments 23, 24 are located in the extreme radial position of the drum during normal operation. Thus, upon acceleration and deceleration, the segments will tend to move with respect to the cam plate 30, that movement being resisted only by the poppet connection 40, thereby giving rise to inadvertent collapse of the segments by overcoming the resistance of the spring-loaded poppet 40.

Figure 2:
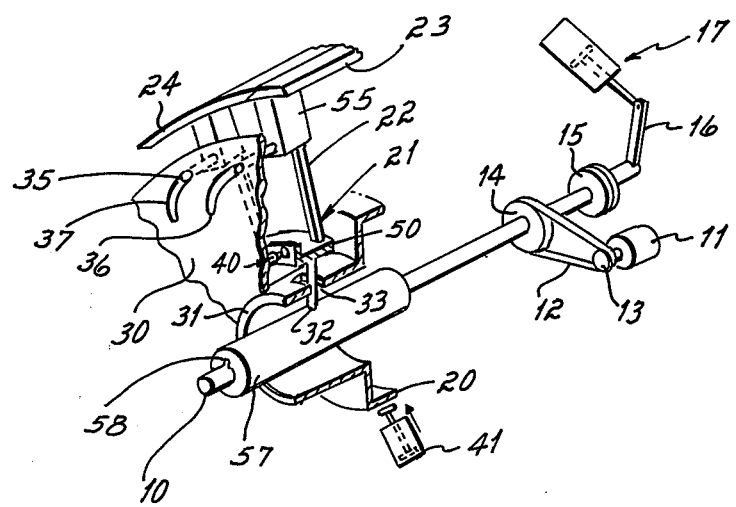
FIG. 2 is a diagrammatic perspective view of the invention.
Figure 3:
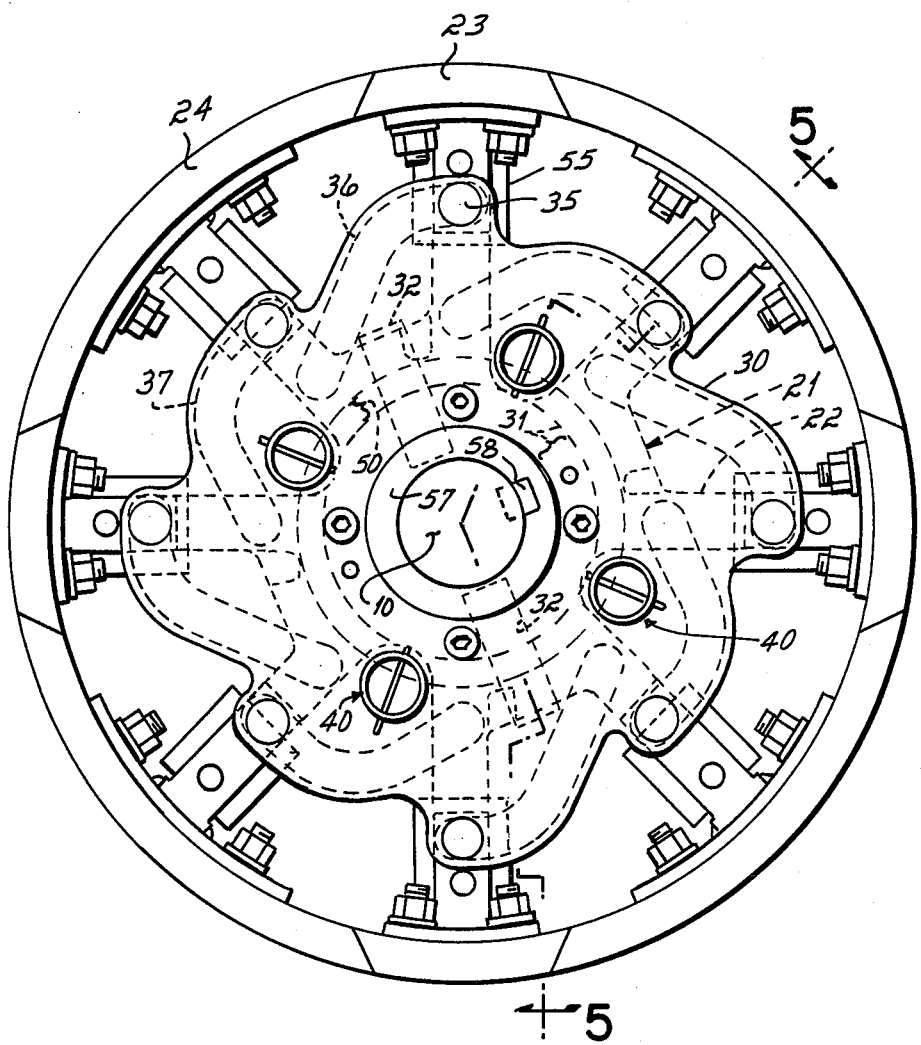
FIG. 3 is an end elevational view of the drum with the segments expanded.
Figure 4:
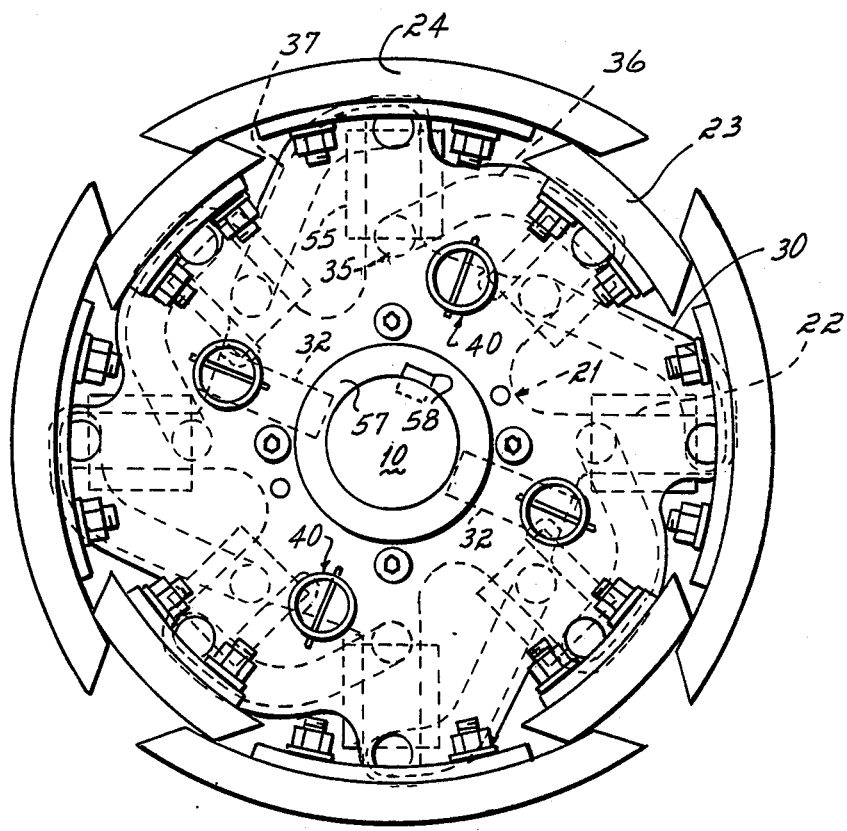
FIG. 4 is an end elevational view of the drum with the segments contracted.
Figure 5:
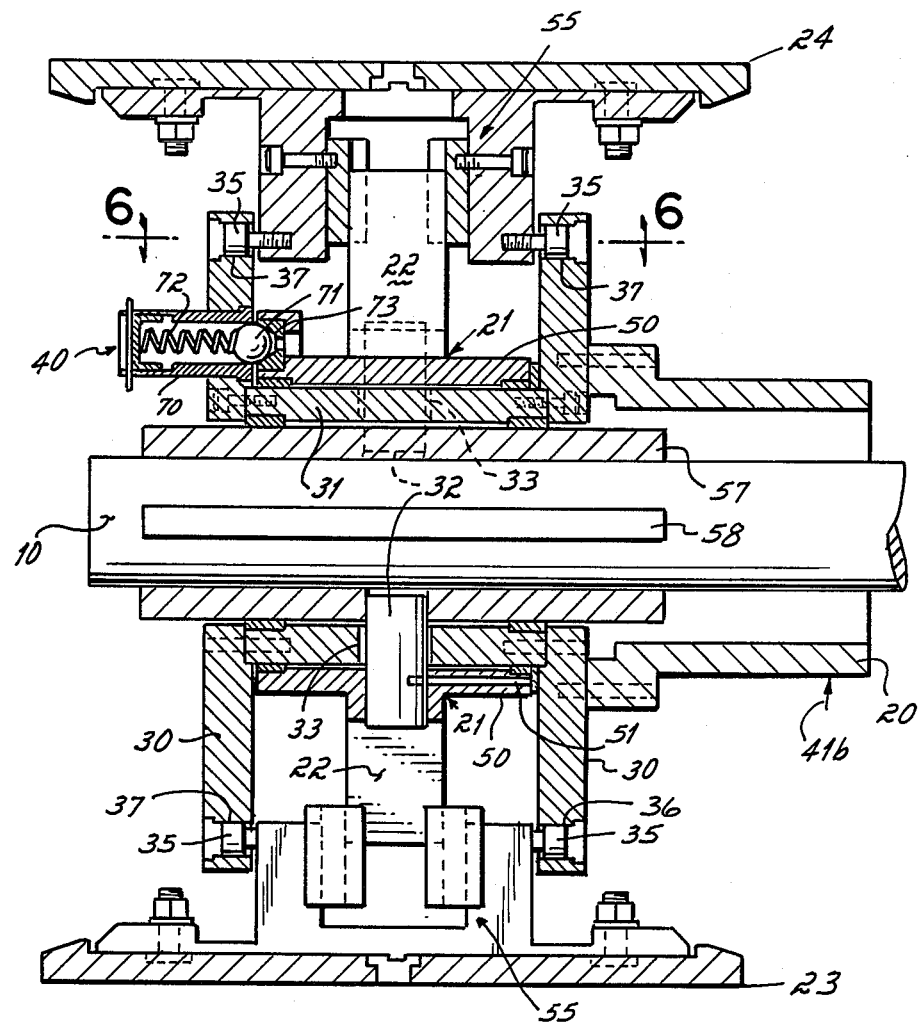
FIG. 5 is a cross-sectional view taken generally along lines 5—5 of FIG. 3.
Figure 6:
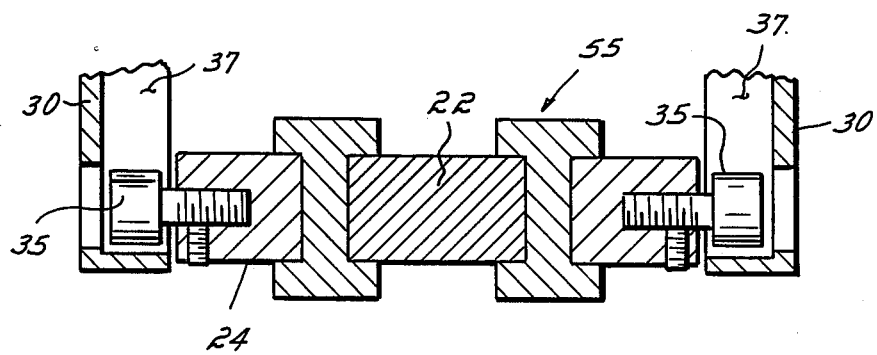
FIG. 6 is a cross-sectional view taken along lines 6—6 of FIG. 5.

The improvement is diagrammatically depicted in FIG. 2. There, the drive shaft 10 mounts a sleeve 57 keyed to the shaft by a key 58. The sleeve 57 carries a key 32. The other end of key 32 is fixed to a spider sleeve 50 that is concentrically mounted around shaft 10. Between the spider sleeve and the drive shaft is a cam plate sleeve 31. The cam plate sleeve has an arcuate slot 33 through which the key 32 passes, permitting limited arcuate movement between them. A cam plate 30 is fixed to the cam plate sleeve 31. Fixedly attached to the cam plate is a hub sleeve 20. The resilient ball formed poppet 40 is interposed between the spider sleeve 50 and the cam plate 30.

With the organization of the invention, the segments 23, 24 are positively and directly driven by the spider 21 that is fixed, through the key 32, to the drive shaft. The cam plate, with its minimum inertia effect, is rotationally carried by the poppet connection 40 between the spider plate and the cam plate.

The inertia effect of segments 23, 24 upon poppet 40 is eliminated upon acceleration, and deceleration is eliminated because the segments are driven directly by the shaft. Thus, the inertia effect upon acceleration and deceleration is greatly reduced, the only inertia being that created by cam plate 30.

One of the preferred forms of the invention is shown in FIGS. 3-6. The drum has four small segments 23 and four large segments 24. Each segment carries a central bearing block 55 (FIGS. 5 and 6) which slidably receives a guide post 22 projecting radially from the center of the drum. Eight posts 22 form the spider 21. Each post is fixedly-mounted on the spider sleeve 50. The spider sleeve 50 is fixed by a pin 51 to the key 32. The key 32 passes radially through a slot 33 of the cam sleeve 31 and is fixed to the inner sleeve 57 which is slidable onto the drive shaft 10 and forms a part of the drive shaft 10 by virtue of the key and keyway 58 (FIG. 3) engagement of the drive shaft 10 with the inner sleeve. Each segment is therefore fixed against rotation with respect to the drive shaft 10 but is slidable radially on the spider post 22 for expansion and contraction. A hub sleeve 20 is concentrically mounted with respect to the inner sleeve 57. The hub sleeve 20 is engageable by the brake 41, diagrammatically illustrated by the arrow 41b in FIG. 5. The hub sleeve 20 carries a pair of cam plates 30, the cam plates 30 being mounted on the cam sleeve 31. Each cam plate has four slots 36 corresponding to the small segments and four slots 37 corresponding to the large segments. It can be seen from FIGS. 3 and 4 that the small slots 36 lie at a more acute angle radius than do the slots 37 for the large segments. Each segment has a pair of followers 35 that ride in the slots 36, 37 of the cam plate. When the followers are rotated with respect to the cam plates, the smaller segments will move more rapidly and farther into the center of the drum than do the large segments so as to be out of the way of the contracting movement of the large segments. In this manner, the segments move from the expanded position of FIG. 3 to the contracted position of FIG. 4.

At least one of the cam plates carries a socket 70 and ball 71 urged out of the socket by a compression spring 72 disposed within the socket. The ball normally rests in a seat 73 fixed to the spider sleeve 50 and, hence, in fixed relation to the drive shaft 10. The ball extending between the socket 70 and seat 73 maintains a driving connection between the spider 21 and the assembly of cam plates 30, thereby forming the poppet connection that holds the cam plates in that position which maintains the segments extended during normal operation.

In normal operation, the segments are driven by the drive shaft 10 operating through the inner sleeve 57, the key 32, the spider 27 and the segments slidably mounted on the posts 22. After a tire carcass has been formed on the cylinder formed by the expanded segments, the motor 11 is deenergized. A brake is applied to the hub sleeve 20 to fix its rotational position. The clutch 15 to the drive shaft 10 is engaged and the piston and cylinder 17 rotates the drive shaft with respect to the braked hub sleeve. The rotation of the drive shaft rotates the segments 23, 24 with respect to the hub sleeve and, hence, with respect to the assembly of cam plates 30. This relative rotation will cause the ball 71 to be cammed out of seat 73 into the socket 70, thereby disconnecting the cam plate from the spider sleeve 50. Rotation of the segments with respect to the cam plates 30 causes the segments to be cammed inward to contract them and to permit removal of the tire carcass. Reversing the direction of the piston and cylinder 17 causes the spider to rotate with respect to the cam plates until the ball pops into the seat 73, in which position the segments have been expanded to form the cylindrical drum.

In the illustrated embodiment, one spider post of rectangular cross section is connected to each segment. In an alternative embodiment, two axially-spaced, circular cross-sectional spider posts are provided for each segment. Aside from that, the basic organization is as described above.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A tire building drum comprising:
   an inner sleeve connected to a machine drive shaft,
   a spider formed of radially-extended shafts fixed to said inner sleeve,
   a plurality of alternating large and small arcuate segments slidably-mounted on said spider shafts and adapted to form a complete tire building cylinder when radially extending and permitting tire removal when radially collapsed,
   at least one cam plate,
   means mounting said cam plate for limited rotary movement on said inner sleeve about said drive shaft,
   followers interconnecting said arcuate segments with said cam plates to effect radial extension and collapse of said segments upon rotation of said cam plate with respect to said inner sleeve, and spring-loaded poppets between said cam plates and said spider normally preventing rotation of said cam plates with respect to said inner sleeve.

2. A tire building drum as in claim 1 in which said mounting means comprises:
a cam sleeve rotatably-mounted on said inner sleeve,
one of said cam plates being mounted on each end of said cam sleeve and on opposite sides of said spider.

3. A tire building drum as in claim 1 further comprising:
a drive dog fixed to said inner sleeve and said spider,
said cam sleeve having an arcuate slot,
said drive dog extending through said arcuate slot.

4. A tire building drum comprising:
a drive shaft,
a plurality of arcuate segments mounted on said shaft for radial movement to expand into a tire building surface and to collapse to permit removal of a tire carcass,
a circular cam mounted on said shaft for limited rotational movement about said shaft,
follower means connecting said cam to said segments to cause said segments to move radially when said cam is rotated with respect to said shaft,
and a resilient poppet connecting said cam to said shaft.

* * * * *